(12) United States Patent
King et al.

(10) Patent No.: US 11,107,273 B2
(45) Date of Patent: Aug. 31, 2021

(54) DYNAMIC THREE-DIMENSIONAL MAP GENERATION FOR COMPUTING ENVIRONMENT

(71) Applicant: EMC IP Holding Company LLC, Hopkinton, MA (US)

(72) Inventors: James R. King, Norwood, MA (US); Nicole Reineke, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 19 days.

(21) Appl. No.: 16/530,034

(22) Filed: Aug. 2, 2019

(65) Prior Publication Data

US 2021/0035358 A1     Feb. 4, 2021

(51) Int. Cl.
*H04L 29/08*     (2006.01)
*G06T 17/05*     (2011.01)

(52) U.S. Cl.
CPC .......... *G06T 17/05* (2013.01); *H04L 67/1061* (2013.01)

(58) Field of Classification Search
CPC ...... G06T 17/05; G06F 16/20; H04L 67/1061
See application file for complete search history.

(56) References Cited

U.S. PATENT DOCUMENTS 8,803,660 B2 *  8/2014  Martin ............... G08C 21/00
                                                340/10.1
9,824,474 B2 * 11/2017  Smith ................ G09G 5/377
9,958,277 B1   5/2018   Espy et al.

OTHER PUBLICATIONS

Bluetooth Sig, Inc., "Service Discovery," https://www.bluetooth.com/specifications/assigned-numbers/service-discovery/, 2019, 18 pages.
Opengarden.com, "The Internet of US," https://www.opengarden.com/, 2018, 2 pages.
Armystudyguide.com, "Find a Location Using Intersection," https://www.armystudyguide.com/content/army_board_study_guide_topics/land_navigation_map_reading/find-a-location-using-int.shtml, downloaded Jul. 30, 2019, 3 pages.
Dev.ti.com, "Bluetooth Low Energy Angle of Arrival (AoA)," http://dev.ti.com/tirex/content/simplelink_academy_cc2640r2sdk_2_30_02_00/modules/blestack/ble_aoa/ble_aoa.html#expandable-updated-aoa_receiver-c-aoa_receiver_cc2640r2lp_a1_app-, downloaded Jul. 30, 2019, 81 pages.

(Continued)

*Primary Examiner* — Said Broome
(74) *Attorney, Agent, or Firm* — Ryan, Mason & Lewis, LLP (57) ABSTRACT

In a computing environment comprising a plurality of equipment racks wherein each equipment rack comprises one or more of compute, storage and network assets, the method captures an image of at least one equipment rack in the computing environment. The method identifies a known object in the image to determine physical characteristics of the equipment rack. The method receives, from a peer-to-peer network, positioning beacon signals respectively associated with at least a portion of the compute, storage and network assets in and around the equipment rack. The method determines a closest asset among the portion of the compute, storage and network assets for which positioning beacon signals are received. The method obtains data indicative of physical characteristics associated with the closest asset, obtains a model of the computing environment based on the obtained data, and then obtains a three-dimensional map of the computing environment based on the model.

20 Claims, 9 Drawing Sheets

(56) References Cited

OTHER PUBLICATIONS

Wikipedia, "Direction Cosine," https://en.wikipedia.org/wiki/Direction_cosine, downloaded Jul. 30, 2019, 2 pages.
Dev.ti.com, "Localization Toolbox," http://dev.ti.com/tirex/content/simplelink_cc2640r2_sdk_2_20_00_49/docs/blestack/ble_user_guide/html/localization/index.html, downloaded Aug. 1, 2019, 19 pages.
Sauli Lehtimaki, "Bluetooth Angle Estimation for Real-Time Locationing," https://www.silabs.com/whitepapers/bluetooth-angle-estimation-for-real-time-locationing, downloaded Aug. 1, 2019, 7 pages.
Wikipedia, "Gossip Protocol," https://en.wikipedia.org/wiki/Gossip_protocol, Jul. 17, 2019, 5 pages.

* cited by examiner

DYNAMIC THREE-DIMENSIONAL MAP GENERATION FOR COMPUTING ENVIRONMENT

FIELD

The field relates generally to computing environments, and more particularly to techniques for generating maps of such computing environments.

BACKGROUND

Data centers are computing environments that include compute, storage and network resources (assets) arranged in multiple rack-mounted enclosures (equipment racks or, simply, racks) placed at various locations within a physical space. Each rack may contain one or more of the compute, storage and networking assets, and the racks and their assets collectively constitute the data center. In some scenarios, a data center includes a cloud computing platform, where "cloud" refers to a collective computing infrastructure that implements a cloud computing paradigm. For example, cloud computing is a model for enabling ubiquitous, convenient, on-demand network access to a shared pool of configurable resources (e.g., compute, storage, network assets) that can be rapidly provisioned and released with minimal management effort or service provider interaction. The dynamic provisioning and interconnection of the various assets is accomplished while the various assets remain positioned in their respective racks. However, generating and maintianing a map of the physical locations of the various assets within a given data center can present significant challenges.

SUMMARY

Embodiments of the invention provide techniques for generating maps of computing environments such as, for example, data centers.

For example, in one embodiment, a method comprises the following steps. In a computing environment comprising a plurality of equipment racks wherein each equipment rack comprises one or more of compute, storage and network assets, the method captures an image of at least one equipment rack in the computing environment. The method identifies a known object in the image to determine physical characteristics of the equipment rack. The method receives, from a peer-to-peer network, positioning beacon signals respectively associated with at least a portion of the compute, storage and network assets in and around the equipment rack. The method determines a closest asset among the portion of the compute, storage and network assets for which positioning beacon signals are received. The method obtains data indicative of physical characteristics associated with the closest asset, obtains a model of the computing environment based on the obtained data, and then obtains a three-dimensional map of the computing environment based on the model.

Advantageously, illustrative embodiments provide for methods of dynamic three-dimensional map generation of a data center based on data and/or measurements gained from a single photo/location, relative indoor positioning, and one or more secondary sources, with a gossip-based mesh network (peer-to-peer network) for membership specification and definitions.

These and other features and advantages of the invention will become more readily apparent from the accompanying drawings and the following detailed description.

DETAILED DESCRIPTION

Illustrative embodiments may be described herein with reference to exemplary computing environments, cloud infrastructure, data repositories, data centers, data processing systems, computing systems, data storage systems and associated servers, computers, storage units and devices and other processing and computing devices. It is to be appreciated, however, that embodiments of the invention are not restricted to use with the particular illustrative system and device configurations shown. Moreover, the phrases "cloud environment," "cloud computing platform," "cloud infrastructure," "data repository," "data center," "data processing system," "computing system," "data storage system," "computing environment," and the like as used herein are intended to be broadly construed, so as to encompass, for example, private and/or public cloud computing or storage systems, as well as other types of systems comprising distributed virtual infrastructure. However, a given embodiment may more generally comprise any arrangement of one or more processing devices.

Current data center mapping is done via manual methods or a combination of disparate asset management systems combined with manual mapping. The need for humans during this process means it is error prone and often abandoned or unmaintainable. This creates a series of operational inefficiencies for customers, support personnel, and ultimately the overall business (enterprise) that owns and/or manages the data center.

More particularly, in the past, generation of a full map of all racks/assets within a data center required an in-person inventory of racks, and visual inspection of the interior rack contents, then manual layout of the physical assets. Physical asset changes often meant manual intervention or "rescanning" of the data center location to ensure up-to-date maps. This is a low-value labor and time intensive task.

Image-based mapping requires extensive training for image recognition and is prone to error. Solutions which automate data center mapping based on a visual image recognition of rack contents, or visual inspection to read in QR codes (such as solutions proposing robots or drones) are unable to deal with complexities such as image obstruction and do not generalize as well as humans. Computer Vision requires computationally intensive training time that can only achieve about 90% accuracy in all scenarios. This is unacceptable in an enterprise data center.

Maps which are generated based on static inventory or network information are unable to consider ongoing movement or disappearance of a physical assets (inclusive of failure or theft). This has a significant impact on data center operators and support personnel who cannot physically locate servers that generate alerts for support. This can propagate downtime events for customers.

Illustrative embodiments overcome the above and other drawbacks associated with existing data center map generation. By combining several functionalities, illustrative embodiments enable the generation of a 3D map of a data center by standing in a single location with a smart device. Such functionalities include, but are not limited to the following:

(i) Smart devices can determine measurements of objects based on an image utilizing relative sizing of known elements. These techniques are readily available in application programs and through smart calculations based on known object size and relative dimension extrusion.

(ii) Indoor positioning technologies can broadcast object location, with membership specification supplying the object type. Smart devices can determine the broadcast object which is closest to the device relative to other devices.

(iii) Modern servers/arrays and data center physical assets are typically shipped and tracked with broadcasting/beacon technology (inclusive of, but not limited to, Bluetooth, RFID, and other broadcasting technologies) as part of manufacturing practices. These beacons have a unique identifier enabling correlation of one signal to one asset.

Thus, as will be further explained herein, illustrative embodiments perform correlation of the location where an image was taken, with relative location of received indoor positioning technologies and combined with a gossip-based mesh network map out an entire data center by standing in a single location. The map is 3D in that each rack and asset is rendered in X, Y, Z coordinates (e.g., length, width, height dimensions). An example of building a 3D map using the techniques described herein will be described in further detail below with respect to FIGS. 4A-4E.

Illustrative embodiments enable a user to near-instantly generate an entire 3D map of their data center, inclusive of racks, rack contents, and all assets. Illustrative embodiments also enable ongoing tracking of assets and components over time. These features leverage advancements in peer discovery, indoor positioning systems, broadcast networks, and image recognition and manipulation on smart devices. Examples of smart devices include, but are not limited to, smart phones, tablets, laptops, smart headsets, smart glasses, etc.

For example, standing at any point in the data center, the user is able to point their smart device camera at a rack or row of racks. The smart device takes a single still-frame moment in time of the assets and using a known object in the picture accurately determines the physical characteristics of the closest rack (inclusive of width and height, proximity to racks next to it and distance from other objects). This defines what will be used as Data Center Position (0,0,0) of Rack0 (including length, width, height).

The same smart device taking that photo also acts as a receiver of indoor positioning broadcast data. Each asset in the data center is equipped with a positioning beacon (e.g., Bluetooth, RFID, or other broadcasting technologies). Utilizing the received signal strength (RSS) from these beacon signals and secondary data source(s), illustrative embodiments automatically determine the closest asset, defined as Asset0 in Rack0. Correlation with secondary data enables the population of the exact device serial number and physical characteristics.

To determine the remaining contents of the rack, illustrative embodiments leverage peer discovery (i.e., the ability of a device to find other similar devices that are in the immediate physical vicinity, i.e., proximity) via a gossip-protocol overlay on top of a mesh network. By having each device serve as a sensor, an observed neighbor model is built with RSS for each neighboring node. When combined with an Angle of Arrival (AoA) implementation, this provides relative proximity in the X, Y, and Z axis. This provides a build-out of relative location of the contents of the first rack.

A gossip-based network is a distributed network of peer devices (in illustrative embodiments, assets with beacons) that is configured to enable peer-to-peer communication that is based on the way gossip is spread. That is, the distributed network uses peer-to-peer transfer of data to ensure that the data is routed to all members of the ad-hoc network. In some cases, the ad-hoc network is a mesh network. A mesh network is a network topology in which the devices connect directly, dynamically and non-hierarchically to as many other devices as possible and cooperate with one another to efficiently route data therebetween. AoA measurement is a method for determining the direction of propagation of a signal or determined from signal strength. In some examples, AoA determines the direction by measuring the time difference of arrival and from these delays the AoA can be calculated.

The smart device then near-instantly provides a 3D rendering of the closest rack and its contents. This 3D rendering can then be expanded within the mesh overlay to build out a model of the remaining assets in the data center. In some scenarios, the first rack build-out only focuses on Y axis relative location data ("higher" or "lower") but with X axis proximity and the smart device measurement data, inference of assets in adjacent racks can be discovered. This process is repeated until all assets in the data center are discovered and modeled.

With secondary data checks on the assets, serial data association can then be performed to ensure that asset sizes are in line with width and height expectations of each asset (e.g., 1U versus 4U servers). When combined with the RSS, it can then be inferred from minimal user input what relative rack-unit each asset is located in. In some embodiments, the minimal user input requires a user to provide the location of at least one "anchor" asset. Given the anchor asset, the locality capabilities described herein may be used to determine the relative location of other assets. The anchor asset or assets may be any random sampled assets. Thus, the minimal user input may include providing an indication that at least one random asset is in a particular location. In some embodiments, the location may be defined in terms of an "actual rack" and "rack-unit" where the actual rack refers to a datacenter rack cabinet giving a relative position in an overall room (e.g., "x" and "y" axis coordinates) and the rack-unit refers to the position within the datacenter rack cabinet (e.g., a "z" axis coordinate). The user would only need to provide the actual rack and rack-unit of additional random sampled assets to start getting more and more accurate mapping. The result is a model of all assets in the data center that can then be provided to a 3D rendering service that maps the data center.

Advantageously, a single location visual indicator on a smart device combined with proximity and a gossip-based mesh network is able to generate a data center map, inclusive of rack layouts and secondary data sources. Illustrative embodiments utilize a smart device to correlate a single physical location with object measurements, a 0,0,0 (X, Y, Z) located beacon and combined with a mesh broadcasting network of three-dimensional beacon data to map an entire data center and its contents standing in one spot. Further, with illustrative embodiments, broadcast mesh network continuous topology updates are available. That is, utilizing illustrative embodiments, it is possible to track the change in signals over time. Movement of physical assets are correlated to changes in nearest-neighbors. Removal, or physical asset failures, can be correlated to beacon silence. The ongoing topology updates can then be mapped in relation to the data center anchor point (Rack0, Asset0, Pos0).

Figure 1:
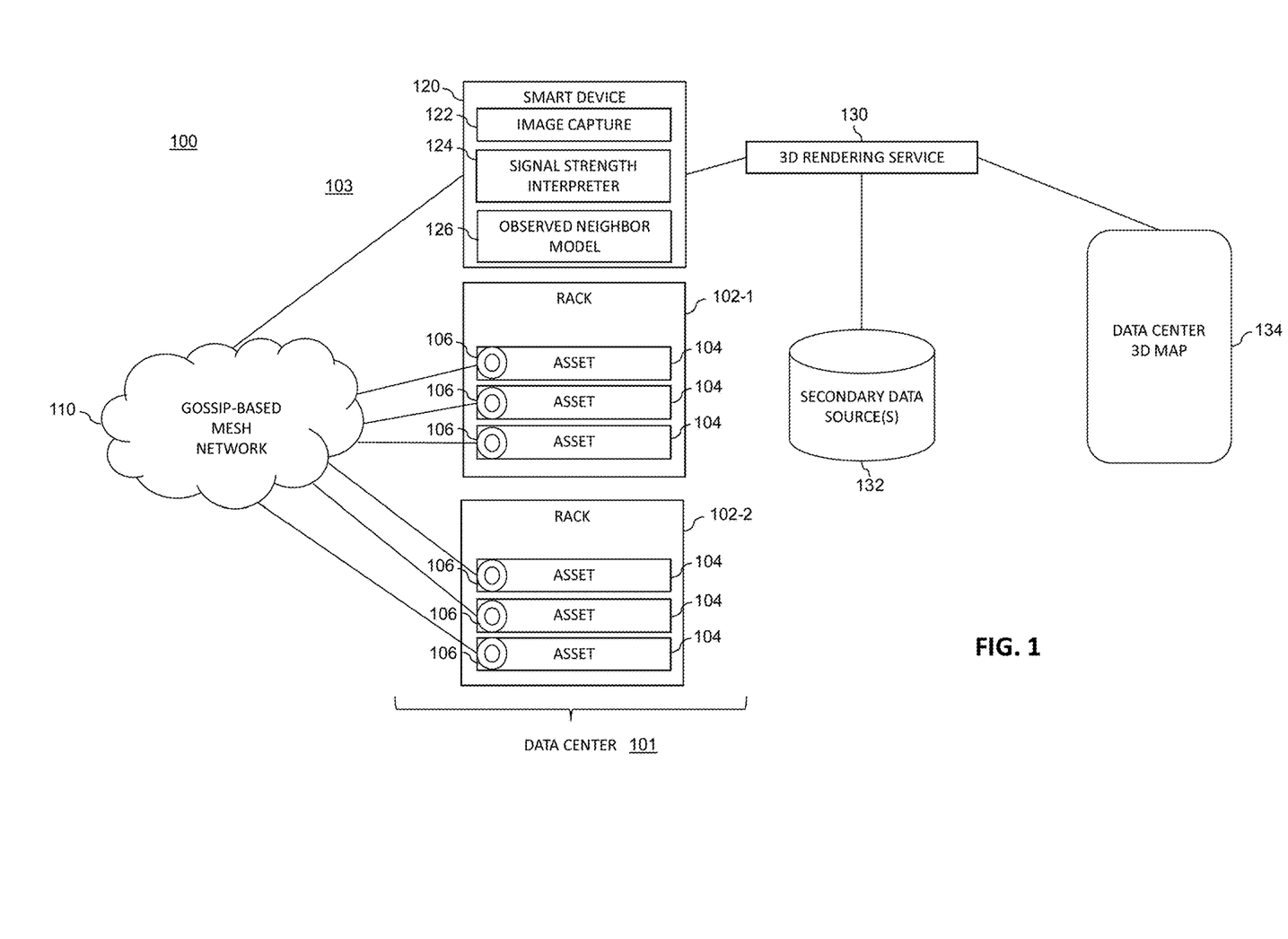
FIG. 1 is a block diagram of an architecture for generating maps of a computing environment, according to an embodiment of the invention.

Turning now to FIG. 1, an architecture 100 is depicted for generating dynamic 3D maps of data centers, in accordance with illustrative embodiments as described herein. As shown, a data center 101 comprises two equipment racks 102-1 and 102-2. It is to be appreciated that this number of racks is for illustrative purposes and typical data centers with which map generation in accordance with illustrative embodiments is performed include more than two equipment racks. Each rack comprises a plurality of assets 104 (compute, storage, network assets) and each asset 106 has a positioning beacon 106 installed thereon or therein. The positioning beacons 106 are part of (peers in) a gossip-based mesh network 110 which is also operatively coupled to a smart device 120 operated by a user 103. Smart device 120 includes an image capture module 122 (e.g., cellular phone camera), a signal strength interpreter 124 and an observed neighbor model 126. The smart device 120 is operatively coupled to a 3D rendering service 130 which is operatively coupled to a secondary data source(s) 132. The 3D rendering service generates a data center 3D map 134.

As mentioned above, standing at any point in the data center 101, the user 103 points image capture module 122 of smart device camera 120 at rack 102-1 or 102-2 (in some embodiments, the camera can be pointed at both racks 102-1 and 102-2). The image capture module 122 takes a single still-frame image of the rack (102-1 or 102-2) and its assets 106. Using a "known object" in the captured image accurately determines the physical characteristics (inclusive of width and height, proximity to racks next to it and distance from other objects) of the closest rack to which the user 103 is positioned. As explained, this location defines what will be used as Data Center Position (0,0,0) of Rack0 (including length, width, height).

The "known object" may be a server in a rack. The smart device 120 participates in the gossip-based mesh network 110, and therefore understands its relative distance to the server or other known object within the rack. Using that distance estimation (e.g., from the smart device 120 to the server or other known object), RSS and the characteristics of the server or other known object (e.g., the size of the server) allows for determining the physical characteristics of the closest rack. For example, from the single still-frame image of the rack and the RSS to the server or other known object, it can be determined that the smart device 120 is 4 feet (ft) from the server or other known object at a 27 degree angle. It is assumed that physical characteristics such as the size of the server or other known object are available (e.g., that the server is 1U (1RU), meaning that it is 1.25 inches tall and 19 or 23 inches wide depending on the rack). The size and other physical characteristics of the server or other known object may be verified by using a serial number look-up to obtain model details for the server or other known object. Based on pixel measurements and taking into account the angles from an internal measurement unit of the smart device 120, the size of the closest rack may be inferred (e.g., as there are nearly 13 data points available for assessing the size of assets in the image).

Further, signal strength interpreter 124 of smart device 120 acts as a receiver of indoor positioning broadcast data from the positioning beacons 106 that are part of the gossip-based mesh network 110. Based on a comparison of the RSS values of the received beacon signals, signal strength interpreter 124 determines the closest asset to the smart device 120. As mentioned, in some embodiments, secondary data from source(s) 132 enables the population of the exact device serial number and physical characteristics of the closest asset. For example, once the smart device 120 determines what it considers a closest asset, secondary data such as a serial number and physical dimensions of the asset can be retrieved from an equipment database (source 132) that maintains that information.

To determine the remaining contents of the rack with the closest asset, the smart device 120 leverages peer discovery via a gossip-based mesh network 110. An observed neighbor model 126 is built with RSS for each neighboring node. A "neighboring node" refers to other assets participating in the gossip-based mesh network 110. When combined with an Angle of Arrival (AoA) implementation, this provides relative proximity in the X, Y, and Z axis. In some embodiments, it is assumed that each asset or neighboring node has an associated neighbor table with RSS and AoA information. Multiple assets may be queried for their associated neighbor tables to perform an overlay. Consider, for example, two antenna arrays (associated with two assets) set perpendicular to each other in Euclidean space. Each antenna array performs a simultaneous phase shift based calculation of $$\theta = \sin^{-1}\left(\frac{\lambda\phi}{2\pi d}\right),$$

where θ is the AoA, λ is the wavelength, φ is the phase shift between two antennas, π is Pi, and d is the distance between the two antennas. The phase shift based calculations of θ may be used to give a 3D vector, which should be phase shifted based on internal measurement readings of the smart device 120 (e.g., readings of a gyroscope of the smart device 120). The servers or other assets are assumed to be equipped similarly for performing the phase shift calculations. The assets, however, are not required to include a gyroscope in cases where the standard orientation of the asset is static (e.g., a server in a rack). Each of the assets can then store a direction cosine, standardizing the relations to a relative angle. Thus, a request between two endpoints or assets allows for an indication of relative positioning (e.g., "I am 3 feet in front, 2 feet up, and 1 foot left of you") to be communicated via beaconing. This provides a build-out of relative location of the contents of the first rack.

The smart device 120 then near-instantly provides a 3D rendering of the closest rack and its contents using 3D rendering service 130. In some embodiments, the rendering service 130 is resident on the smart device 120, while in other embodiments, service 130 is fully or partially remote from the smart device 120. This 3D rendering can then be expanded within the mesh overlay to build out model 126 of the remaining assets in the data center. The first rack build-out only focuses on Y axis relative location data ("higher" or "lower") but with X axis proximity and the smart device measurement data, inference of assets in adjacent racks can be discovered. This process is repeated until all assets in the data center are discovered and modeled, and data center 3D map 134 is completed. Note that map 134 can be presented on the smart device 120 and/or on some other computer system. Note also that the rendering service 130 can be part of the smart device 120, remote from the smart device 120, or some combination thereof. Also, in alternative embodiments, model generation can be fully or partially remote from the smart device 120.

Figure 2:
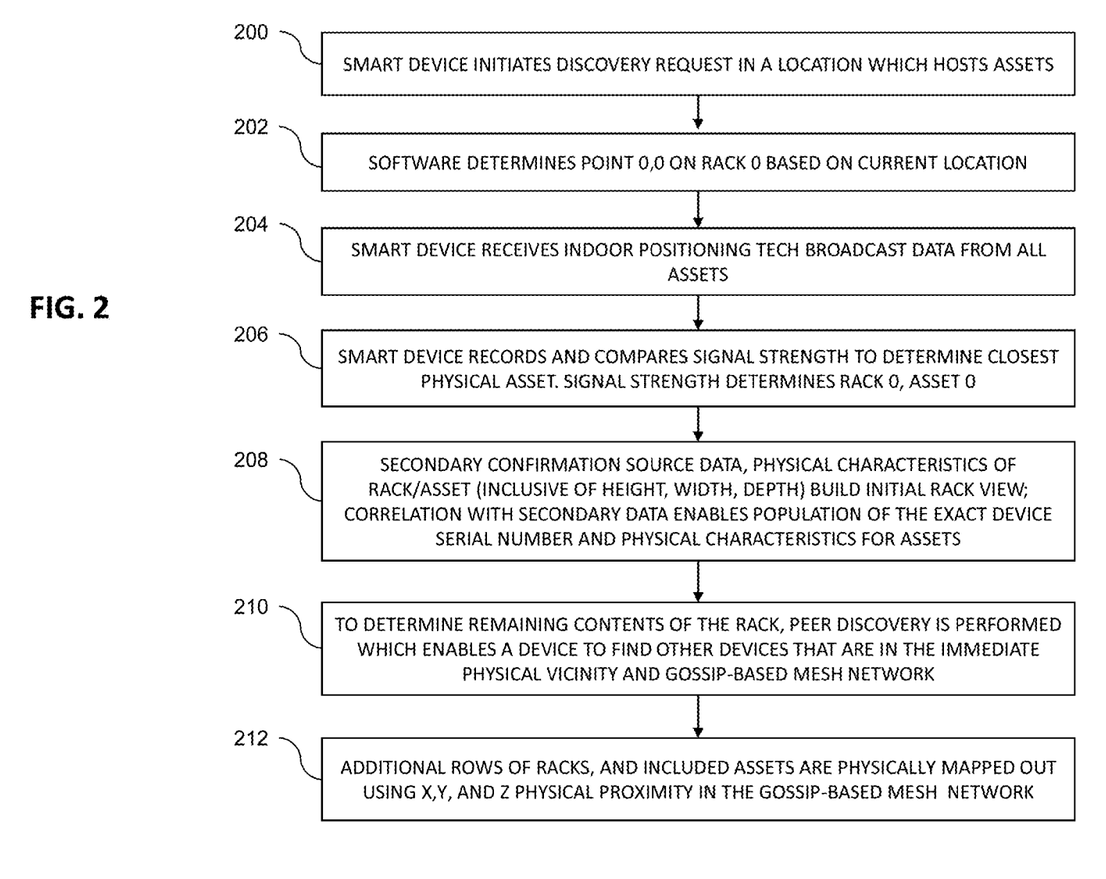
FIG. 2 is a flow diagram of a methodology for generating maps of a computing environment, according to an embodiment of the invention.

FIG. 2 is a methodology for generating maps of computing environments, according to an embodiment of the invention. It is to be appreciated that the methodology in FIG. 2 can be performed in accordance with architecture 100 of FIG. 1 to map data center 101.

As shown, in step 200, smart device 120 initiates a discovery request in a location which hosts assets (i.e., data center 101). The discovery request can be sent to the gossip-based mesh network 110 and the 3D rendering service 130 to initiate the map generation process.

In step 202, software on the smart device 120 determines point 0,0 on rack 0 based on current location.

In step 204, smart device 120 receives indoor positioning broadcast data from all assets 104.

Smart device 120 records and compares signal strength to determine the closest physical asset in step 206. Signal strength determines Rack 0, Asset 0.

In step 208, secondary source data is used to build an initial rack view.

To determine remaining contents of the rack, in step 210, peer discovery is performed to find other similar devices that are in the immediate physical vicinity and gossip-based mesh network 110.

In step 212, additional rows of racks, and included assets are physically mapped out using X,Y, and Z physical proximity in the gossip-based mesh network 110.

Figure 3:
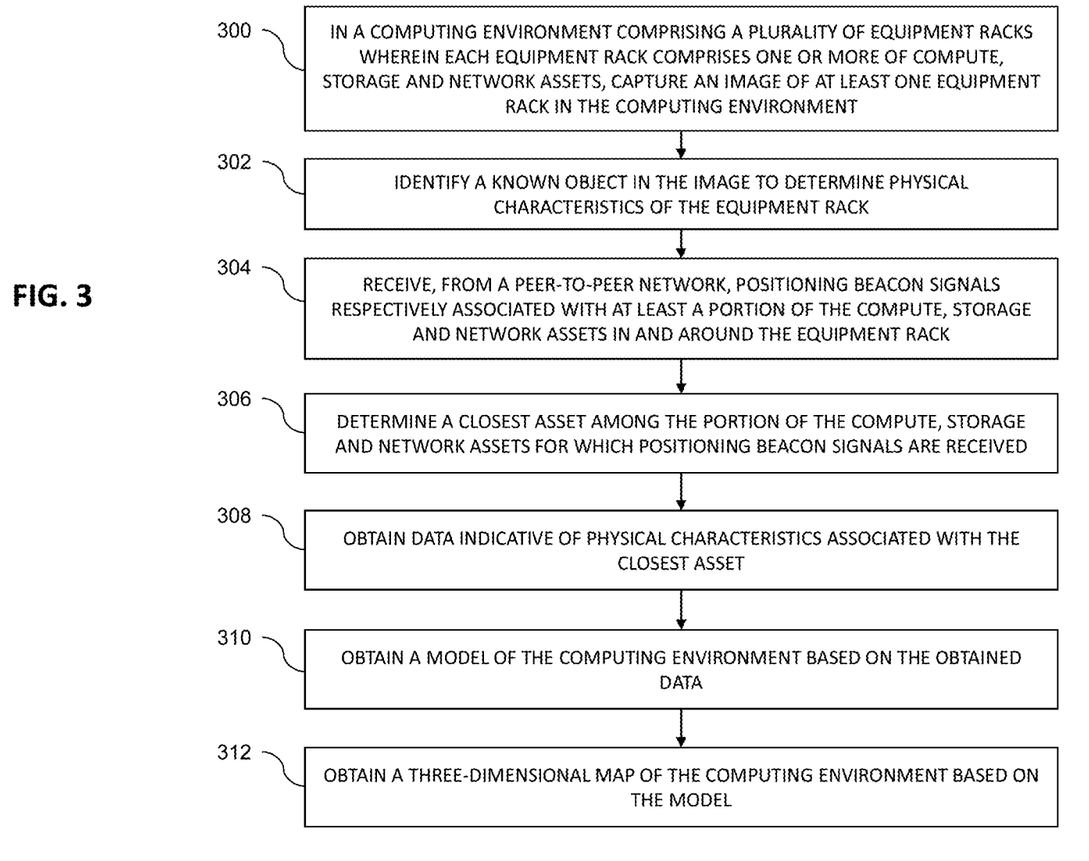
FIG. 3 is a flow diagram of another methodology for generating maps of a computing environment, according to an embodiment of the invention.

FIG. 3 is a methodology for generating maps of computing environments, according to another embodiment of the invention. It is to be appreciated that the methodology in FIG. 3 can be performed in accordance with architecture 100 of FIG. 1 to map data center 101.

As shown, in a computing environment comprising a plurality of equipment racks wherein each equipment rack comprises one or more of compute, storage and network assets, step 300 captures an image of at least one equipment rack in the computing environment.

Step 302 identifies a known object in the image to determine physical characteristics of the equipment rack.

Step 304 receives, from a peer-to-peer network, positioning beacon signals respectively associated with at least a portion of the compute, storage and network assets in and around the equipment rack.

Step 306 determines a closest asset among the portion of the compute, storage and network assets for which positioning beacon signals are received.

Step 308 obtains data indicative of physical characteristics associated with the closest asset.

Step 310 obtains a model of the computing environment based on the obtained data.

Step 312 obtains a three-dimensional map of the computing environment based on the model.

The particular processing operations and other system functionality described in conjunction with FIGS. 1, 2 and 3 are presented by way of illustrative example only, and should not be construed as limiting the scope of the disclosure in any way. Alternative embodiments can use other types of operations and protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

The following is a non-limiting illustrative use case with which the above-described data center map generation architecture and methodologies can be applied in some embodiments.

Assume Enterprise A has a data center of approximately 2,000 square feet. They are running many platforms, servers, storage, and arrays. They do not currently have a map of their infrastructure. On each asset, there is a Bluetooth device that is running a beacon service and support mesh software. Each beacon is associated with a serial number of the asset and an iDRAC/BMC/other management port. In accordance with illustrative embodiments, a user can walk into the data center, take a picture of one of the racks at any point in the data center. Illustrative embodiments then generate the full data center physical rack layout (calculating the rack height and width and depth) with in-rack assets with U location relative to the other in-rack assets and builds out the rows and racks for the entire 2,000 square feet. New assets added to the data center are automatically added when they are discovered in the mesh network. Assets which no longer appear on the mesh network are marked as "orphaned." Assets which change location note the timeline and new location. This enables Enterprise A to visualize their current state, past states and visualize the change over time.

Figure 4A:
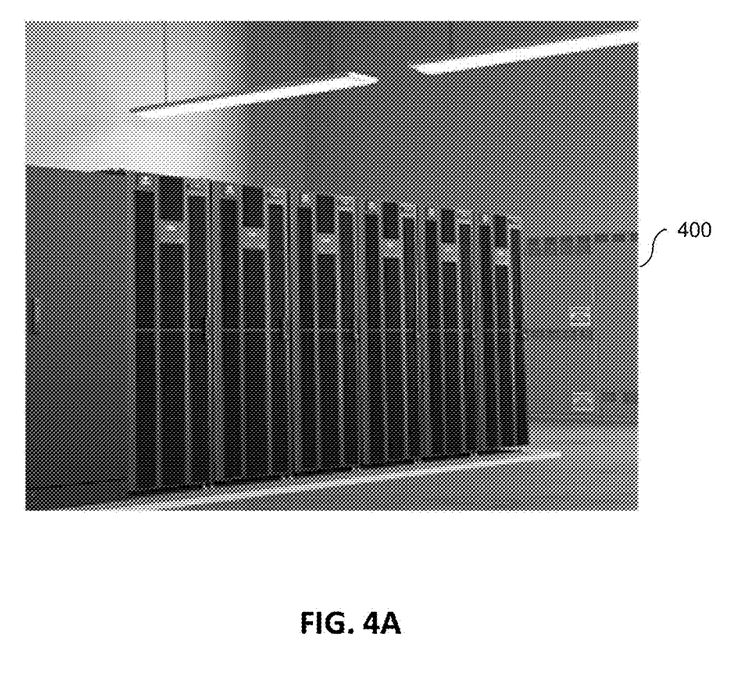
FIGS. 4A-4E illustrate generation of a map of a computing environment, according to an embodiment of the invention.
Figure 4B:
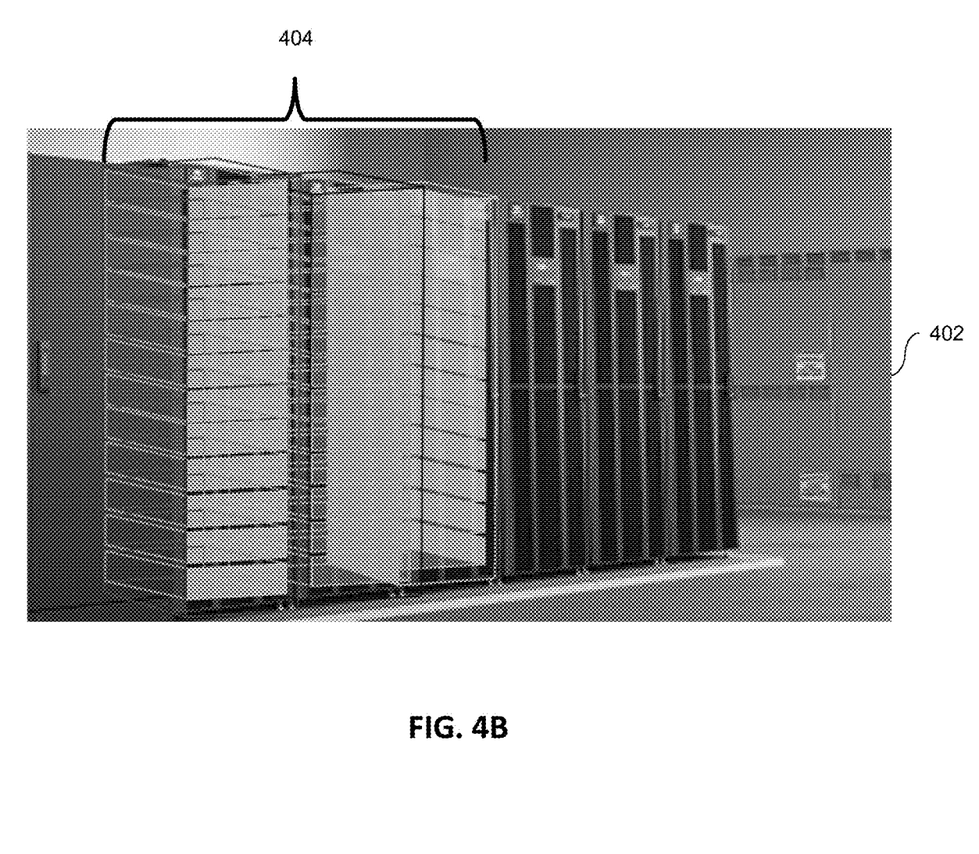

FIGS. 4A-4E depict an example of building a 3D map of a portion of a data center. FIG. 4A shows an image 400 of a closed physical data center rack. The image 400 may be captured by the smart device 120 using image capture module 122. FIG. 4B illustrates an image 402, which shows the closed physical data center rack from image 400 as well as three additional racks 404 that are populated. Using broadcasting/beaconing technology such as Bluetooth, it is determined that additional assets exist in the data center shown in image 400. In this case, it is assumed that such additional assets are racks and servers. The image 400 may thus be augmented as shown in FIG. 4B. FIG. 4B shows an augmented image 402, where three additional racks 404 are populated in the image 400. Each of the additional assets detected using the broadcasting/beaconing technology is represented as a box in one of the three additional racks 404.

Figure 4C:
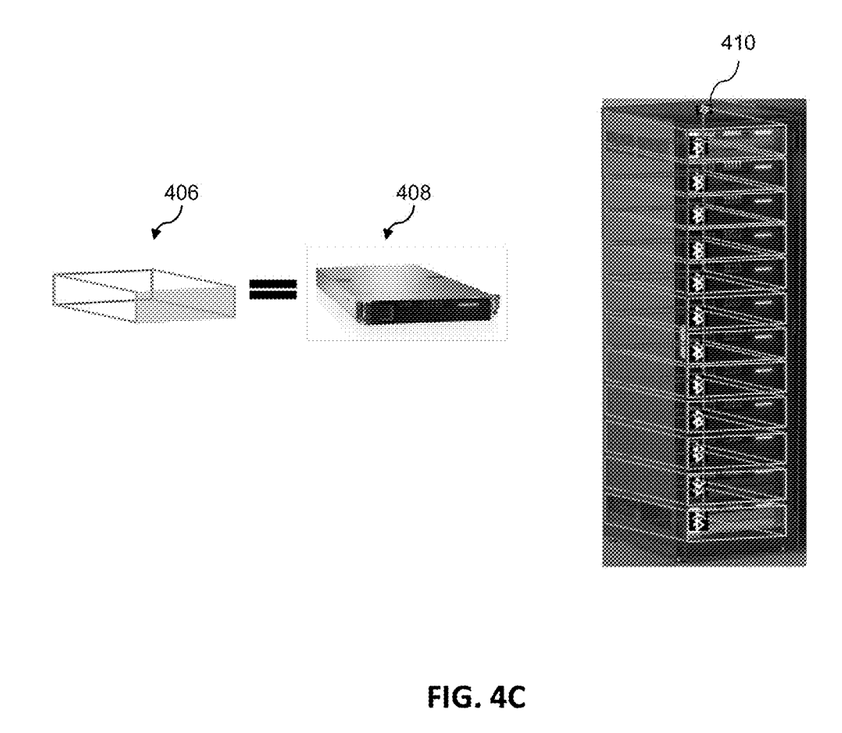
Figure 4D:
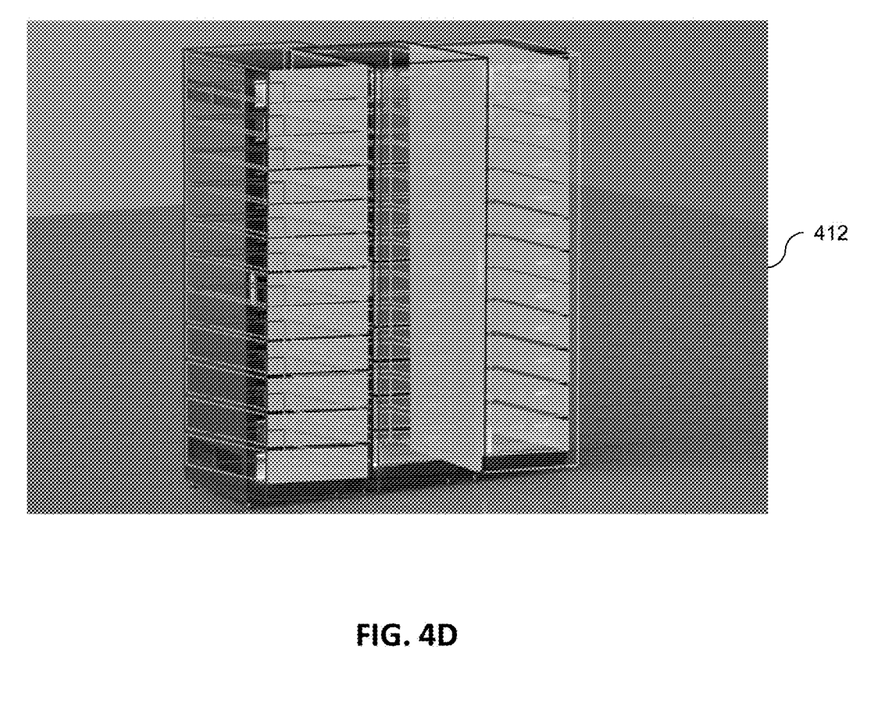
Figure 4E:
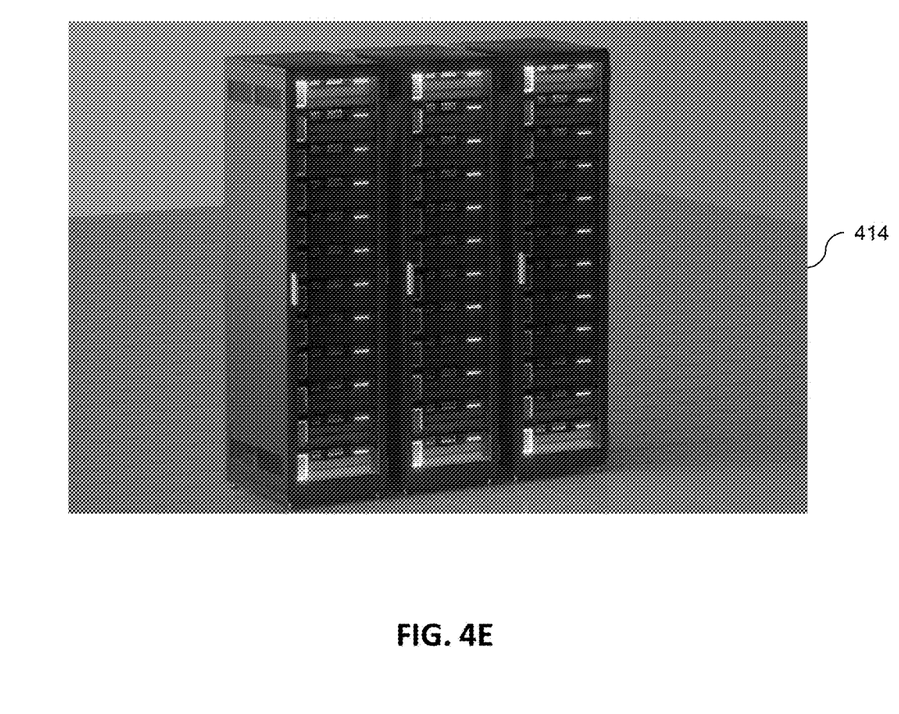

Secondary sources may be used to correlate assets to a type of server or other hardware that the asset represents. In FIG. 4C, it is determined that a particular asset 406 (e.g., represented as a 3D rectangle) may be correlated to a particular type of server using the techniques described herein. An image 408 of that server may be obtained from one or more secondary sources. The image 408 may then be used to build up a physical rendering of a rack 410 (e.g., one of the racks 404 in image 402, assuming that each asset in that rack corresponds to an instance of the server represented by image 408). It should be noted that obtaining source images of an asset is not a requirement. If a particular asset does not have a corresponding source image available, for instance, that asset may be represented as a 3D rectangle or other placeholder visualization of an asset as desired. FIG. 4D shows an image 412 of the three racks 404 populated in FIG. 4B. In this example, it is assumed that each of the three racks are built out with the same server type, and thus each of the 3D rectangles in the three racks 404 may be replaced with a secondary source image to result in the image 414 shown in FIG. 4E. The image 414 shows a fully populated rendering of the three racks 404. The image 414 may be projected onto a Network Operations Center (NOC) wall or otherwise utilized for 3D mapping of at least a portion of a data center.

Figure 5:
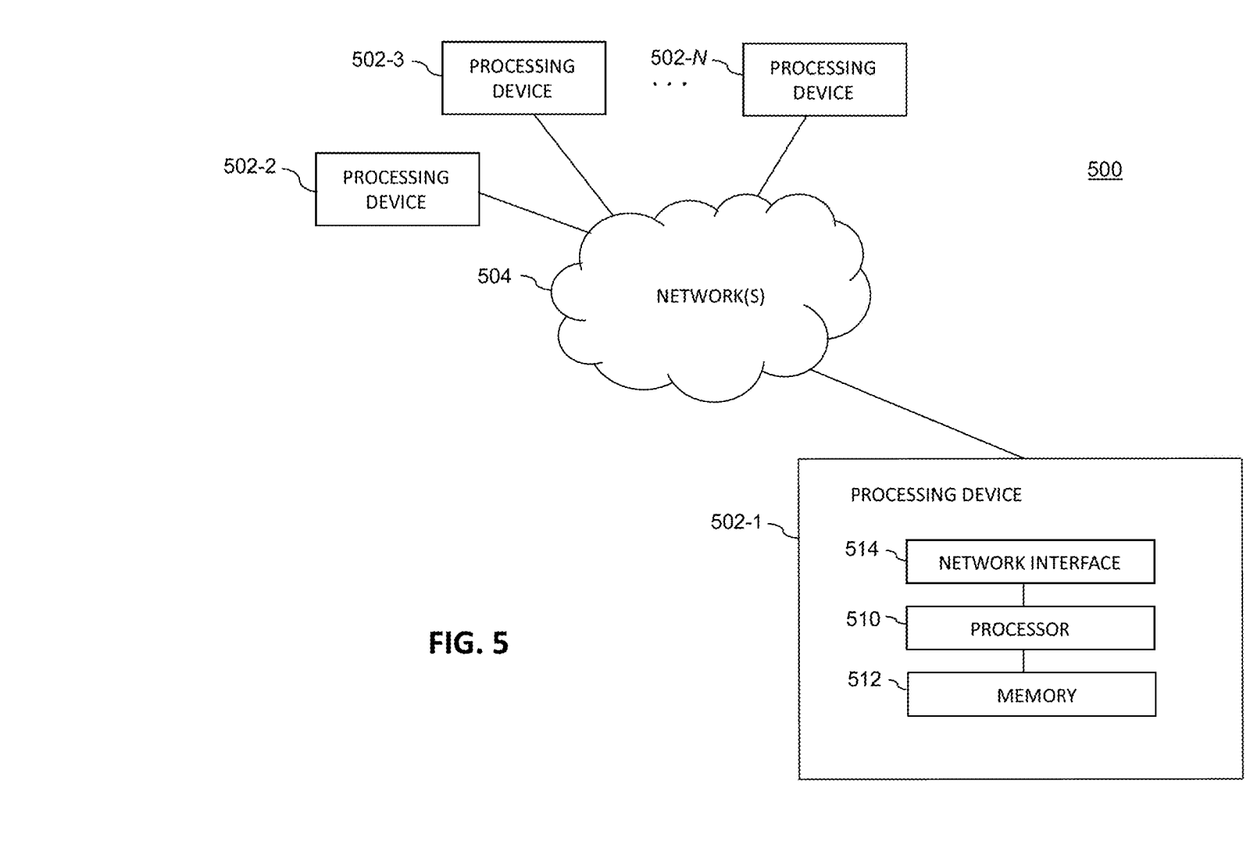
FIG. 5 illustrates a processing platform used to implement an architecture for generating maps of computing environments, according to an embodiment of the invention.

FIG. 5 illustrates a processing platform used to implement an architecture for generating maps of computing environments, according to an embodiment of the invention. More particularly, processing platform 500 is a processing platform on which a computing environment with improved map generation functionalities (e.g., FIGS. 1-4 and otherwise described herein) can be implemented.

The processing platform 500 in this embodiment comprises a plurality of processing devices, denoted 502-1, 502-2, 502-3, . . . 502-N, which communicate with one another over network(s) 504. It is to be appreciated that the methodologies described herein may be executed in one such processing device 502, or executed in a distributed manner across two or more such processing devices 502. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment. Note that components described in the architecture 100 of FIG. 1 can comprise one or more of such processing devices 502 shown in FIG. 5. The network(s) 504 represent one or more communications networks that enable components to communicate and to transfer data therebetween, as well as to perform other functionalities described herein.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random-access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the networks 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the system shown as 500 in FIG. 5 may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual (logical) processing elements implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the computing environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
in a computing environment comprising a plurality of equipment racks wherein each equipment rack comprises one or more of compute, storage and network assets, capturing an image of at least one equipment rack in the computing environment;
identifying a known object in the image to determine physical characteristics of the equipment rack;
receiving, from a peer-to-peer network, positioning beacon signals broadcasted by one or more signal emitters respectively associated with at least a portion of the compute, storage and network assets in and around the equipment rack;
determining a closest asset among the portion of the compute, storage and network assets for which positioning beacon signals are received;
obtaining data indicative of physical characteristics associated with the closest asset;
obtaining a model of the computing environment based on the obtained data; and
obtaining a three-dimensional map of the computing environment based on the model;
wherein the steps are performed via at least one processing device comprising a processor and a memory.

2. The method of claim 1, further comprising determining, from the peer-to-peer network, one or more compute, storage and network assets in a proximity of the closest asset.

3. The method of claim 2, further comprising determining relative coordinates for the one or more compute, storage and network assets in the proximity of the closest asset.

4. The method of claim 3, further comprising obtaining data indicative of physical characteristics associated with the one or more compute, storage and network assets in the proximity of the closest asset.

5. The method of claim 4, further comprising updating the model of the computing environment using the obtained data indicative of physical characteristics associated with the one or more compute, storage and network assets in the proximity of the closest asset.

6. The method of claim 5, further comprising obtaining an updated three-dimensional map of the computing environment based on the updated model.

7. The method of claim 6, further comprising repeating the model and three-dimensional map updating steps until each of the plurality of equipment racks and their corresponding compute, storage and network assets are rendered in the three-dimensional map of the computing environment.

8. The method of claim 1, wherein the step of determining the closest asset among the portion of the compute, storage and network assets for which positioning beacon signals are received further comprises comparing received signal strength values for the received positioning beacon signals to determine the closest asset.

9. The method of claim 1, wherein the peer-to-peer network is a gossip-based mesh network.

10. The method of claim 1, wherein one or more of updating the model and the three-dimensional map are performed on a device that performs the capturing, identifying, receiving and determining steps.

11. The method of claim 1, wherein one or more of updating the model and the three-dimensional map are performed remote from a device that performs the capturing, identifying, receiving and determining steps.

12. A system, comprising:
at least one processor, coupled to a memory, and configured to:
in a computing environment comprising a plurality of equipment racks wherein each equipment rack comprises one or more of compute, storage and network assets, capture an image of at least one equipment rack in the computing environment;
identify a known object in the image to determine physical characteristics of the equipment rack;
receive, from a peer-to-peer network, positioning beacon signals broadcasted by one or more signal emitters respectively associated with at least a portion of the compute, storage and network assets in and around the equipment rack;
determine a closest asset among the portion of the compute, storage and network assets for which positioning beacon signals are received;
obtain data indicative of physical characteristics associated with the closest asset;
obtain a model of the computing environment based on the obtained data; and
obtain a three-dimensional map of the computing environment based on the model.

13. The system of claim 12, wherein the at least one processor and memory are further configured to determine, from the peer-to-peer network, one or more compute, storage and network assets in a proximity of the closest asset.

14. The system of claim 13, wherein the at least one processor and memory are further configured to determine relative coordinates for the one or more compute, storage and network assets in the proximity of the closest asset.

15. The system of claim 14, wherein the at least one processor and memory are further configured to obtain data indicative of physical characteristics associated with the one or more compute, storage and network assets in the proximity of the closest asset.

16. The system of claim 15, wherein the at least one processor and memory are further configured to update the model of the computing environment using the obtained data indicative of physical characteristics associated with the one or more compute, storage and network assets in the proximity of the closest asset.

17. The system of claim 16, wherein the at least one processor and memory are further configured to obtain an updated three-dimensional map of the computing environment based on the updated model.

18. The system of claim 17, wherein the at least one processor and memory are further configured to repeat the model and three-dimensional map updating steps until each of the plurality of equipment racks and their corresponding compute, storage and network assets are rendered in the three-dimensional map of the computing environment.

19. An article of manufacture comprising a processor-readable storage medium having encoded therein executable code of one or more software programs, wherein the one or more software programs when executed by at least one processing device implement steps of:

in a computing environment comprising a plurality of equipment racks wherein each equipment rack comprises one or more of compute, storage and network assets, capturing an image of at least one equipment rack in the computing environment;

identifying a known object in the image to determine physical characteristics of the equipment rack;

receiving, from a peer-to-peer network, positioning beacon signals broadcasted by one or more signal emitters respectively associated with at least a portion of the compute, storage and network assets in and around the equipment rack;

determining a closest asset among the portion of the compute, storage and network assets for which positioning beacon signals are received;

obtaining data indicative of physical characteristics associated with the closest asset;

obtaining a model of the computing environment based on the obtained data; and obtaining a three-dimensional map of the computing environment based on the model.

20. The article of claim 19, wherein the peer-to-peer network is a gossip-based mesh network.

* * * * *